US007324605B2

(12) United States Patent
Maltsev et al.

(10) Patent No.: US 7,324,605 B2
(45) Date of Patent: Jan. 29, 2008

(54) HIGH-THROUGHPUT MULTICARRIER COMMUNICATION SYSTEMS AND METHODS FOR EXCHANGING CHANNEL STATE INFORMATION

(75) Inventors: Alexander A. Maltsev, Nizhny Novgorod (RU); Ali S. Sadri, San Diego, CA (US); Vadim S. Sergeyev, Nizhny Novgorod (RU); Adrian P. Stephens, Cottenham (GB); John S. Sadowsky, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 642 days.

(21) Appl. No.: 10/810,771

(22) Filed: Mar. 26, 2004

(65) Prior Publication Data

US 2005/0152473 A1 Jul. 14, 2005

Related U.S. Application Data

(60) Provisional application No. 60/536,071, filed on Jan. 12, 2004.

(51) Int. Cl.
*H04L 27/00* (2006.01)
(52) U.S. Cl. ...................... 375/299; 375/260
(58) Field of Classification Search ............... 375/299, 375/260, 267
See application file for complete search history.

(56) References Cited

U.S. PATENT DOCUMENTS

2003/0161282 A1 8/2003 Medvedev et al.
2004/0032354 A1* 2/2004 Knobel et al. ............. 341/133
2004/0085917 A1* 5/2004 Fitton et al. ............... 370/292
2004/0136349 A1* 7/2004 Walton et al. ............. 370/338
2004/0235529 A1* 11/2004 Tarokh et al. ............. 455/562.1
2005/0138194 A1* 6/2005 Lu et al. .................... 709/230

FOREIGN PATENT DOCUMENTS

EP 1187506 A1 3/2002
EP 1533963 A2 5/2005
WO WO-2005/034435 A2 4/2005

OTHER PUBLICATIONS

"802.11g™ IEEE Local and Metropolitan Area Networks; Part 11: Wireless LAN Medium Access Control (MAC) and Physical Layer (PHY) Specifications; Amendment 4: Further Higher Data Rate Extension in the 2.4 GHz Band", *IEEE Std 802.11g™*, The Institute of Electrical and Electronics Engineers, Inc. NY, (Jun. 27, 2003), 78 pgs.
"International Search Report for corresponding PCT Application No. PCT/US2005/001032", (Jun. 23, 2005), 4 pgs.
"Supplement to IEEE Standard for IT-Telecommunications & Information Exchange Between Systems—Local and Metropolitan Area Networks—Specific Requirements, Part 11:Wireless LAN Medium Access Control (MAC) and Physical Layer (PHY) Specifications: High-Speed Physical Layer in 5GHZ Band", *IEEE Std 802.11a-1999*, (Dec. 30, 1999), 90 pgs.
Bangerter, B., et al., "Wireless Technologies: High-Throughput Wireless LAN Air Interface", *Intel Technology Journal*, 7(3), (Aug. 19, 2003), 47-57.

* cited by examiner

*Primary Examiner*—Chieh M. Fan
*Assistant Examiner*—Jaison Joseph
(74) *Attorney, Agent, or Firm*—Schwegman, Lundberg & Woessner, P.A.; Gregory J. Gorrie

(57) ABSTRACT

A frame structure for communicating over a high-throughput communication channel includes a channelization field as part of a current data unit to indicate a frequency and space configuration of subsequent portions of the current data unit.

37 Claims, 8 Drawing Sheets

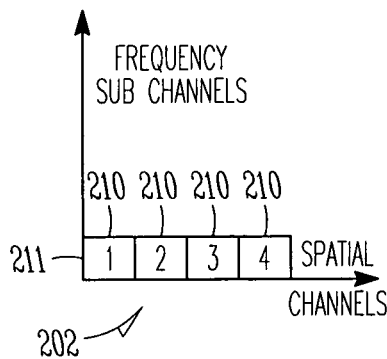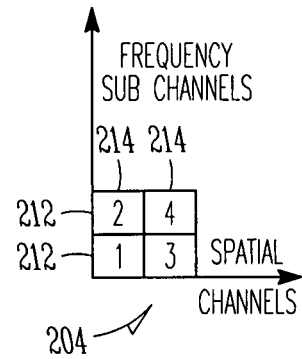
*FIG. 2A*          *FIG. 2B*
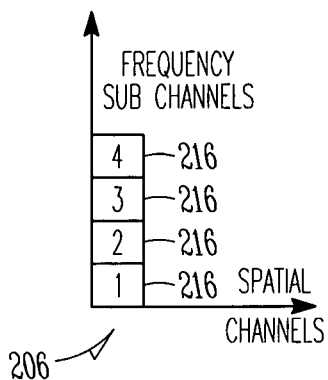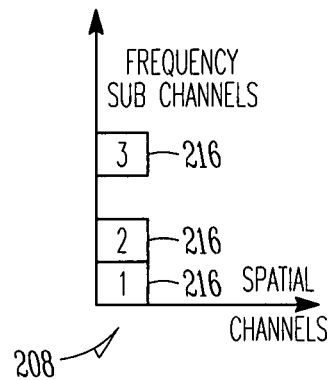
*FIG. 2C*          *FIG. 2D*
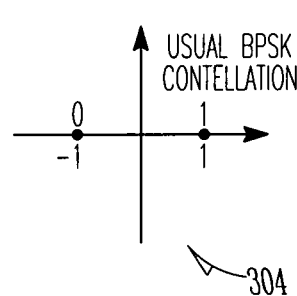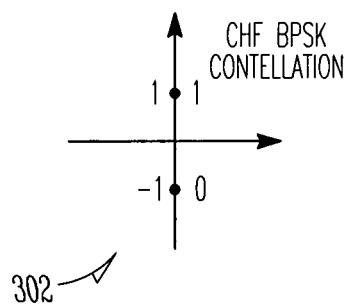
*FIG. 3*

HIGH-THROUGHPUT MULTICARRIER COMMUNICATION SYSTEMS AND METHODS FOR EXCHANGING CHANNEL STATE INFORMATION

CROSS-REFERENCE TO RELATED APPLICATIONS

This application claims the benefit of priority under 35 U.S.C. 119(e) to U.S. Provisional Patent Application Ser. No. 60/536,071, filed Jan. 12, 2004, which is incorporated herein by reference.

TECHNICAL FIELD

Embodiments of the present invention pertain to electronic communications, and in particular to wireless communications, and in some embodiments, to wireless communications using orthogonal frequency division multiplexed (OFDM) signals.

BACKGROUND

Many modern digital communication systems, including wireless local area networks (WLANs), are using multicarrier communications to help signals survive in environments having multipath reflections and/or strong interference. One problem with conventional systems that use multicarrier transmission techniques is that the channel bandwidth is limited by the frame structure employed.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

FIGS. 2A through 2D are frequency-space illustrations of subchannels and spatial channels of various high-throughput communication channels in accordance with some embodiments of the present invention;

FIG. 3 illustrates rotated binary phase shift keying (BPSK) modulation in accordance with some embodiments of the present invention;

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
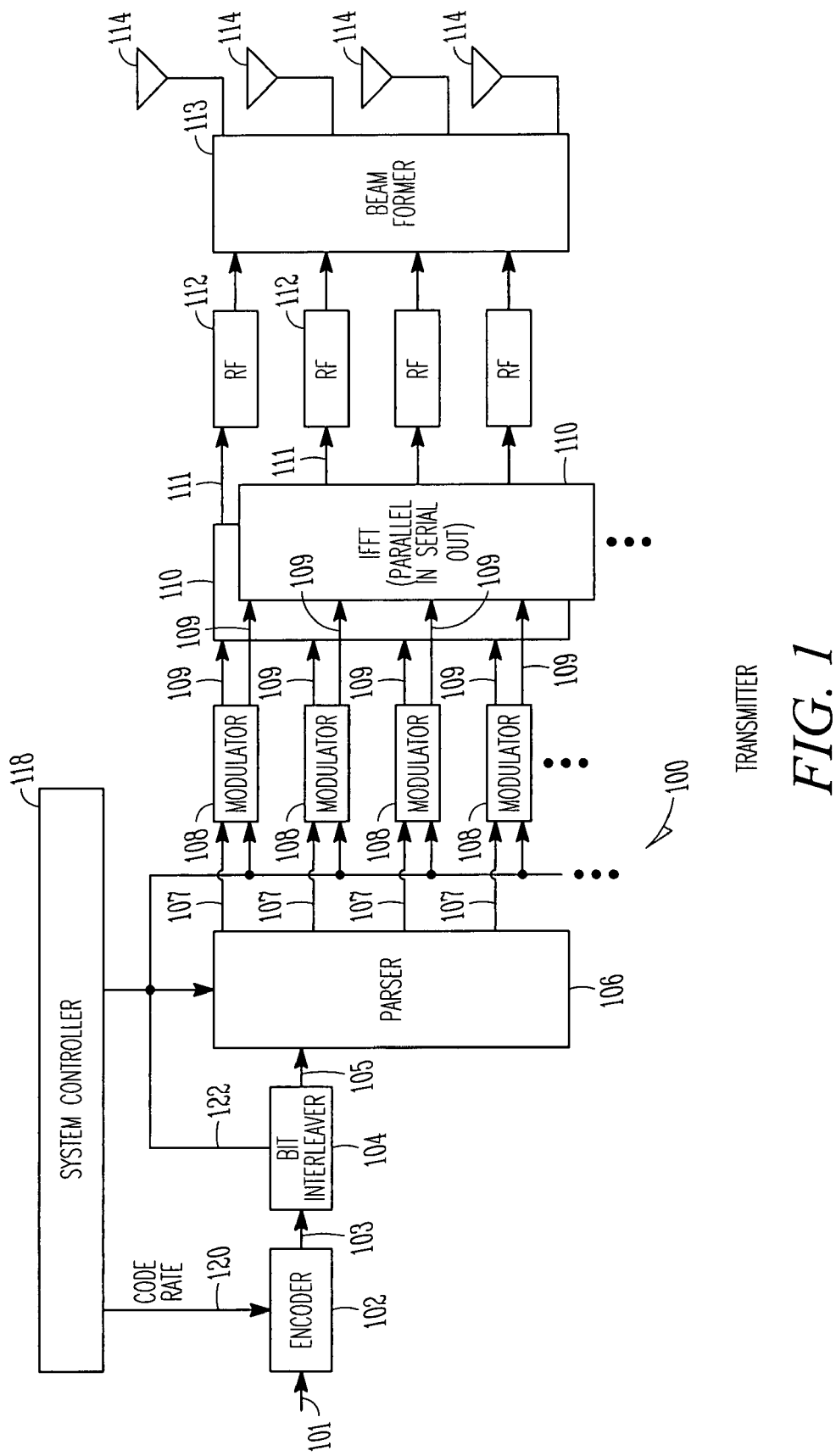
FIG. 1 is a block diagram of a transmitter in accordance with some embodiments of the present invention.

FIG. 1 is a block diagram of a transmitter in accordance with some embodiments of the present invention. Transmitter 100 may be part of a wireless communication device, and may transmit multicarrier communication signals. In some embodiments, transmitter 100 may transmit orthogonal frequency division multiplexed (e.g., OFDM) communication signals, although the scope of the invention is not limited in this respect. In some embodiments, transmitter 100 may be part of a high-throughput communication station and may transmit a packet on a high-throughput (HT) communication channel. The high-throughput communication channel may comprise one or more subchannels and one or more spatial channels as further described below.

In accordance with embodiments of the present invention, transmitter 100 may employ a frame structure which may include a plurality of fields including a channelization field (CHF) as part of a current data unit. The channelization field may indicate a frequency and space configuration of subsequent portions of the current data unit. In these embodiments, at least some fields that follow the channelization field may be transmitted in accordance with the frequency and space configuration indicated in the channelization field. In some embodiments, the channelization field may indicate whether the transmitter is operating in a wideband (WB) mode utilizing a wideband channel, a multiple-input-multiple-output (MIMO) mode utilizing a MIMO channel, or a WB-MIMO mode utilizing a WB-MIMO channel.

FIGS. 2A through 2D are frequency-space illustrations of subchannels and spatial channels of a high-throughput communication channel in accordance with some embodiments of the present invention. FIG. 2A illustrates MIMO channel 202 which may comprise single subchannel 211 having up to four spatial subchannels 210. Each spatial channel 210 of MIMO channel 202 may have distinct data streams transmitted thereon, although the scope of the invention is not limited in this respect. FIG. 2B illustrates WB-MIMO channel 204, which may comprise two or more frequency separated subchannels 212 wherein each subchannel has two or more spatial channels 214. Each subchannel 212 and each spatial channel 214 of WB-MIMO channel 204 may have distinct data streams transmitted thereon, although the scope of the invention is not limited in this respect. FIGS. 2C and 2D illustrate wideband channels 206 and 208 which may have up to four or more frequency separated subchannels 216. Each subchannel 216 of wideband channel 206 and/or wideband channel 208 may have distinct data streams transmitted thereon, although the scope of the invention is not limited in this respect.

In some embodiments, a wideband channel may have a wideband channel bandwidth of up to 80 MHz of either contiguous or non-contiguous frequency space and may comprise up to four or more subchannels, although the scope of the invention is not limited in this respect. In some embodiments, subchannels may be non-overlapping orthogonal frequency division multiplexed channels and may utilize separate frequency bands. In some embodiments, each subchannel may have a subchannel bandwidth of approximately 20 MHz, although the scope of the invention is not limited in this respect. In some embodiments, subchannels may be 20 MHz channels from a U-NII band. In some embodiments, each subchannel may comprise a plurality of orthogonal subcarriers.

In some embodiments, spatial channels may be non-orthogonal channels (e.g., overlapping in frequency) associated with one of the subchannels in which orthogonality between the spatial channels may be achieved by receiver and/or transmitter beamforming and/or antenna diversity. In some embodiments, spatial channels may be associated with one of the subchannels. In some embodiments, a spatial channel may utilize the same frequency subcarriers of the associated subchannel as the other spatial channels of the associated subchannel.

Referring to FIG. 1, in some embodiments, transmitter 100 may utilize more than one of spatially-diverse antennas 114 and/or beamformer 113 to "divide" one or more subchannels into one or more of the spatial channels. In these embodiments, signals for each spatial channel may be transmitted using more than one of antennas 114 with beamforming coefficients for the particular spatial channel. In some embodiments, signals for the spatial channels are multiplexed so that signals for all spatial channels of a subchannel may be transmitted substantially simultaneously.

In some embodiments, each spatial channel may be associated with one of transmit antennas 114 (FIG. 1), although the scope of the present invention is not limited in this respect. In some embodiments, each spatial channel may carry separate subsymbols of an OFDM symbol. In other embodiments, spatial channels may carry the same data, although the scope of the invention is not limited in this respect.

In some embodiments, each subchannel may comprise up to 48 or more data subcarriers, which may be closely spaced OFDM subcarriers, although the scope of the invention is not limited in this respect. The subchannels may be frequency-division multiplexed (i.e., separated in frequency) and may be within a predetermined frequency spectrum. To help achieve orthogonality between closely spaced subcarriers, in these embodiments, the subcarriers of a particular subchannel may have null at substantially a center frequency of the other subcarriers of that subchannel.

In some embodiments when transmitter 100 communicates in a MIMO mode, each spatial channel may be used to communicate separate or independent data streams on the same subcarriers as the other spatial channels, allowing the communication of additional data without an increase in frequency bandwidth. The use of spatial channels may take advantage of the multipath characteristics of the channel.

In accordance with some embodiments, data for transmission is provided to transmitter 100 in the form of bit stream 101. Encoder 102 may apply forward error correcting (FEC) codes to bit stream 101 to generate coded bits comprising bit stream 103. In some embodiments, encoder 102 may encode bit stream 101 in accordance with code rate 120. Code rate 120 may include code rates of ½, ⅔ and ¾, although the scope of the invention is not limited in this respect. Bit interleaver 104 may perform an interleaving operation on a block of bits to generate interleaved blocks of bits 105. Blocks of bits 105 may represent an OFDM symbol. Parser 106 may parse blocks of bits 105 into groups of bits 107. In some embodiments, the groups may have a number of coded bits. In some embodiments, the number of coded bits of a group may be determined by the spatial-frequency subcarrier modulation assignments associated with a particular subcarrier of a particular spatial channel. In some embodiments, parser 106 may include a serial-to-parallel conversion to provide groups of bits 107 in a parallel form to subcarrier modulators 108.

In some embodiments, subcarrier modulators 108 may individually modulate (e.g., quadrature-amplitude modulate) the groups of bits 107 on OFDM subcarriers depending on the characteristics of the high-throughput communication channel being used by transmitter 100. In some embodiments, a subcarrier modulator may be associated with each subcarrier frequency of a subchannel. In some embodiments, modulators 108 may generate symbol-modulated subcarriers 109 in accordance with subcarrier modulation assignments from system controller 1118, although the scope of the invention is not limited in this respect.

In some embodiments, an OFDM symbol may be represented by the combination of all symbol-modulated subcarriers 109. In some of these embodiments, a plurality of individual subcarrier modulators 108 (e.g., one for each subcarrier) may each separately modulate an individual subcarrier. In some embodiments, each one of subcarrier modulators 108 may modulate symbols for a different frequency subcarrier of the different spatial channels. For example, in the case of MIMO channel 202 (FIG. 2), a first of subcarrier modulators 108 may modulate subcarriers of a first frequency for each spatial channel 210, a second of subcarrier modulators 108 may concurrently modulate the subcarriers of a third frequency for each spatial channel 210, etc.

Inverse Fast Fourier transform (IFFT) circuitry 110 may perform IFFTs on symbol-modulated subcarriers 109 to generate time domain representations of the OFDM symbol. Almost any form of inverse discrete Fourier transform (IDFT) may be used to perform the inverse transform operation. The number of time domain samples generated by IFFT circuitry 110 may be equal to the number of frequency components input thereto. In some embodiments, IFFT circuitry 110 may generate a time domain waveform for each spatial channel and/or subchannel from the combination of symbol-modulated subcarriers 109 for that spatial channel and/or subchannel.

IFFT circuitry 110 may also convert the time domain samples generated by the IFFT operation, which may be in a parallel form, to one or more serial symbol streams 111. IFFT circuitry 110 may also add a cyclic extension (or guard interval) to reduce inter-symbol interference in the channel. Radio frequency (RF) circuitry 112 may prepare each of serial symbol streams 111 for RF transmission over the high-throughput communication channel.

In some embodiments, spatially diverse antennas 114 and/or beamformer 113 may be provided RF signals from an associated one of RF circuitry 112 for transmission over one or more spatial subchannels or one or more subchannels. In some embodiments, spatially diverse antennas 114 may be separated by a distance. A minimum separation distance may be based on the wavelength of the frequency spectrum used for communicating. In some embodiments, a separation of a few centimeters may be sufficient to help assure multipath differences between antennas 114. Antennas 114 may comprise one or more directional or omnidirectional antennas, including, for example, dipole antennas, monopole antennas, loop antennas, microstrip antennas or other types of antennas suitable for transmission of RF signals by transmitter 100.

When transmitter 100 is operating in WB mode and is to communicate fields of a data unit over a WB communication channel, each of IFFT circuitry 110 and associated RF circuitry 112 may generate RF signals for transmission over an associated subchannel. For example, when a WB channel comprises four subchannels, each of four IFFT circuitries 110 and an associated one of RF circuitry 112 may generate RF signals for a subchannel. Subchannels 216 (FIG. 2C) illustrate an example of a WB channel when transmitter 100 operates in a WB mode. In this mode, a separate one of antennas 114 may be used for transmission of signals from each subchannel, although this is not a requirement. In some embodiments, several or all of antennas 114 may be used to transmit signals in one spatial channel and/or subchannel to achieve a higher signal-to-noise ratio at the receiving communication station.

When transmitter 100 is operating in a MIMO mode and is to communicate at least some fields of a data unit over a MIMO channel, each of IFFT circuitry 110 and an associated one of associated RF circuitry 112 may generate RF signals for transmission over an associated spatial channel. In this mode, RF circuitry 112 may generate RF signals in the same frequency spectrum for an associated spatial channel. In some embodiments, beamformer 113 may generate beamforming coefficients to allow transmission of each spatial channel using antennas 114. In some embodiments, transmitter 100 may transmit up to four spatial channels—one for each IFFT circuitry 110 and associated RF circuitry 112, although the scope of the invention is not limited in this respect. Spatial channels 210 (FIG. 2A) illustrate an example of a MIMO channel when transmitter 100 operates in MIMO mode.

When transmitter 100 is operating in a WB-MIMO mode and is to communicate at least some fields of a data unit over a WB-MIMO channel, some of IFFT circuitry 110 and associated ones of RF circuitry 112 may generate RF signals for transmission of an associated spatial channel, such as spatial channels 214 (FIG. 2B), and some of IFFT circuitry 110 and associated ones of RF circuitry 112 may generate RF signals for transmission of an associated subchannel, such as subchannels 212 (FIG. 2B). In some embodiments, transmitter 100 may transmit on a high-throughput channel comprising up to two subchannels each having up to two spatial channels. In these embodiments, each of IFFT circuitry 110 and an associated RF circuitry 112 may be associated with each spatial channel-subchannel combination. In some embodiments, one or more of antennas 114 may also be associated with each spatial channel-subchannel combination, although the scope of the invention is not limited in this respect. In other embodiments, beamformer 113 may be used to allow transmission of more than one spatial channel by two or more of antennas 114.

In some embodiments, beamformer 113 may be used to direct antenna beams toward a receiving communication station. In some embodiments, beamformer may generate beamforming coefficients to transmit particular fields of frames with predetermined antenna patterns. This is described in more detail below.

In some embodiments, when a receiving station and a transmitting station each have more than one antenna, the spatial streams may be established by applying beamforming coefficients by the receiving station and/or the transmitting station. When either the receiving station or the transmitting station have one antenna, only one spatial stream may be used. In this case, beamforming may be applied at the end that has more than one antenna to increase the signal-to-noise ratio at the receiver thus increasing reliability of the link and/or increasing the data transfer rate. For example, when the receiving station has one receive antenna and the transmitting station has more than one transmit antenna, the transmitting station may concentrate its emissions at the receiver by applying transmit beamforming using beamformer 113. When transmitting station 100 has a single transmit antenna and the receiving station uses more than one receive antenna, the receiving station may be able to combine received signals from the different receiving antennas by applying receive beamforming.

In some embodiments, bit interleaver 104 may input a variable number of coded bits of bit stream 103 into an interleaver matrix of interleaver 104. In some embodiments, the variable number of coded bits may comprise one OFDM symbol and may comprise the number of coded bits per OFDM symbol (Ncbps).

In some embodiments, system controller 118 may generate and provide transport format parameters 122 to one or more other elements of transmitter 100 as illustrated. Transport format parameters 122 may include the spatial-frequency subcarrier modulation assignments as well as the number of coded bits per OFDM symbol. The transport format parameters may also include other information to specify how the OFDM symbol is to be modulated. In some embodiments, the transport format parameters may include, in addition to the number of coded bits per OFDM symbol, the number of bits to be modulated on each spatial stream. In some embodiments, interleaver 104 may also be provided the subcarrier modulation assignments, although the scope of the invention is not limited in this respect.

In some embodiments, parser 106 may parse a block of bits representing an OFDM symbol into groups having a variable number of coded bits, and subcarrier modulators 108 may individually modulate the groups of bits on OFDM subcarriers in accordance with the spatial-frequency subcarrier modulation assignments to generate symbol-modulated subcarriers 109. IFFT circuitry 110 may generate time domain waveforms from the symbol-modulated subcarriers for subsequent RF transmission over the spatial channels. In these embodiments, the number of groups of bits may be equal to a number of spatial channels multiplied by a number of the OFDM subcarriers of the channel.

In some embodiments, transmitter 100 may include an RF chain for each spatial channel and/or subchannel. The RF chain may comprise one of RF circuitry 112 and an associated one of IFFT circuitry 110 for each spatial channel and/or subchannel. Although one of antennas 114 is illustrated for each RF chain, this is not a requirement. Modulators 108, on the other hand, may be associated with particular subcarriers rather than spatial channels or subchannels so that any one modulator may modulate corresponding subcarriers (i.e., of the same subcarrier frequency) of each of the spatial channels and/or modulate subcarriers of each subchannel being used. For each subcarrier, multiple symbols may be processed by one of modulators 108.

In some embodiments, parser 106 may be a spatial-frequency parser to parse a block of bits of a variable size into spatial-frequency groups of bits. Each spatial-frequency group may be associated with a spatial channel-subchannel combination and a subcarrier frequency of the associated spatial channel-subchannel combination of the high-throughput communication channel.

In some embodiments, the functions of interleaver 104 and parser 106 may be performed in a different order than described above. For example, the parsing may be performed before interleaving, although the scope of the invention is not limited in this respect. In these embodiments, a symbol interleaver may be used after parsing. In some embodiments, interleaving may be performed separately for each spatial channel-subchannel combination, although the scope of the invention is not limited in this respect. In some embodiments, encoder 102 may use a code, such as a low-density parity check code (LDPC) that does not always require an interleaving operation.

In some embodiments, transmitter 100 may include a spatial-frequency interleaver. In some embodiments, interleaving may be performed before, during or after parsing, and may be performed on any groups of bits to help assure that adjacent bits are separated by at least two subcarriers.

In accordance with some embodiments, transmitter 100 may symbol-modulate the subcarriers in accordance with individual subcarrier modulation assignments. This may be referred to as adaptive bit loading (ABL). Accordingly, one or more bits may be represented by a symbol modulated on a subcarrier. The modulation assignments for the individual spatial channel and/or subchannel may be based on the channel characteristics or channel conditions for that subcarrier, although the scope of the invention is not limited in this respect.

In some embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation orders with higher data communication rates per subcarrier may also be used.

In some embodiments, an OFDM symbol may be viewed as the combination of the symbols modulated on the individual subcarriers of the spatial channel-subchannel combination comprising a high-throughput channel. Because of the variable number of bits per symbol-modulated subcarrier and the variable number of spatial channel-subchannel combinations that may comprise a high-throughput communication channel. In some of these embodiments, the number of bits per OFDM symbol may vary greatly.

In some embodiments, transmitter 100 may transmit RF communications in accordance with specific communication standards, such as the Institute of Electrical and Electronics Engineers (IEEE) standards including IEEE 802.11 (a), 802.11 (b), 802.11 (g/h), 802.11 (n) and/or 802.16 standards, although transmitter 100 may also be suitable to transmit communications in accordance with other techniques including the Digital Video Broadcasting Terrestrial (DVB-T) broadcasting standard, and the High performance radio Local Area Network (HiperLAN) standard.

Although some embodiments of the present invention may be discussed in the exemplary context of an 802.11x implementation, the claims are not so limited. Indeed, embodiments of the present invention may well be implemented as part of any wireless system using multicarrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

In some embodiments, the frequency spectrums for a wideband channel may comprise subchannels in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, transmitter 100 may be part of a wireless communication device 100, which may comprise a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly.

Although transmitter 100 is illustrated as having several separate functional elements, one or more of the functional elements may be combined and may be implemented by combinations of software-configured elements, such as processing elements including digital signal processors (DSPs), and/or other hardware elements. For example, one or more of the elements illustrated may comprise one or more microprocessors, DSPs, application specific integrated circuits (ASICs), and combinations of various hardware and logic circuitry for performing at least the functions described herein.

FIG. 3 illustrates rotated binary phase shift keying (BPSK) modulation in accordance with some embodiments of the present invention. In some embodiments, transmitter 100 (FIG. 1) may transmit a channelization field (described in more detail below) of a data unit on a compatibility channel with rotated BPSK modulation 302. In these embodiments, subcarriers of the compatibility channel may be rotated in phase. The compatibility channel may comprise one subchannel of a plurality of subchannels. In some embodiments, the compatibility channel may be a predetermined subchannel, and in some embodiments, may comprise a channel of a U-NII band, although the scope of the invention is not limited in this respect. In these embodiments, rotated BPSK modulation 302 may comprise phase shifting RF signals by substantially either +90 or −90 degrees. Conventional BPSK modulation 304, on the other hand comprises phase shifting signals with zero or 180 degrees. The phase shifted signals may comprise bits of a digital bit stream representing data comprising the channelization field. In some embodiments, a zero bit may result in a −90 degree phase shift of the RF signal, while a one bit may result in a +90 degree phase shift of the RF signal, although the scope of the invention is not limited in this respect.

In some embodiments, rotated BPSK modulation 302 may comprise rotating a symbol constellation representing data comprising the channelization field substantially by either +90 or −90 degrees from the symbol constellation of conventional BPSK modulation, although the scope of the invention is not limited in this respect. In some embodiments, rotating the symbol constellation to generate rotated BPSK modulation 302 may be performed by subcarrier modulators 108 (FIG. 1), although the scope of the invention is not limited in this respect.

In some embodiments, encoder 102 (FIG. 1) may encode digital bit stream 101 (FIG. 1) representing data comprising the channelization field with code rate 120 (FIG. 1) prior to rotating the BPSK modulation and transmitting the channelization field of the current data unit.

Figure 4A:
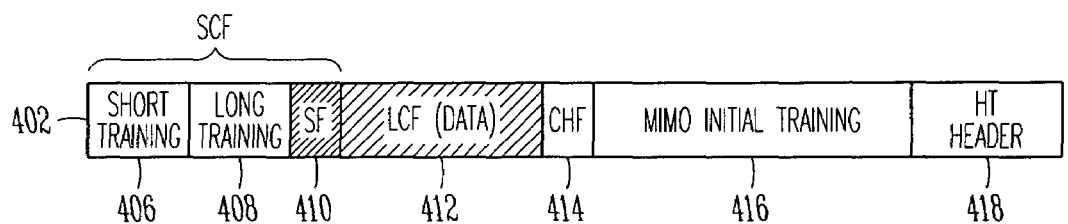
FIGS. 4A and 4B illustrate a training frame format in accordance with some embodiments of the present invention.
Figure 4B:
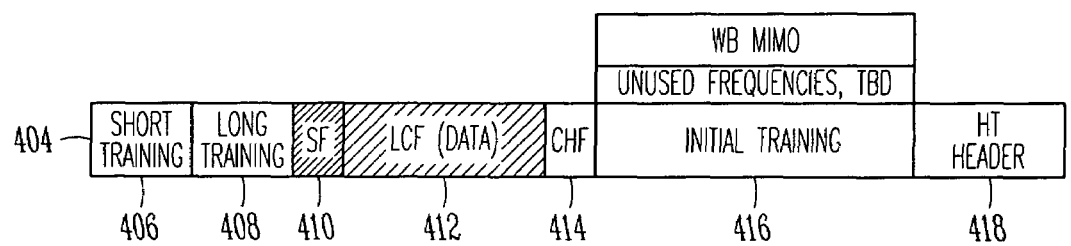

FIGS. 4A and 4B illustrate a training frame format in accordance with some embodiments of the present invention. Frames 402 and 404 may be used as an initial training for channel matrix measurements of the spatial channel-subchannel combinations that may comprise a high-throughput communication channel. In some embodiments, frames 402 and 404 may be used by transmitter 100 (FIG. 1) to transmit request-to-send (RTS) frames, although the scope of the invention is not limited in this respect.

Figure 5A:
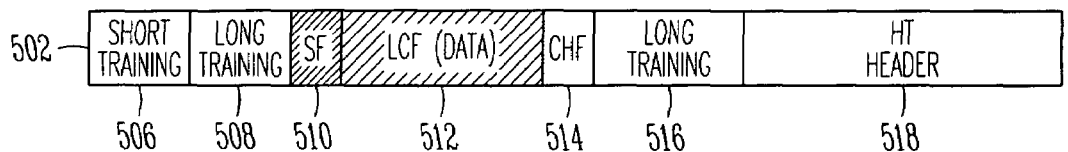
FIGS. 5A and 5B illustrate a feedback frame format in accordance with some embodiments of the present invention.
Figure 5B:
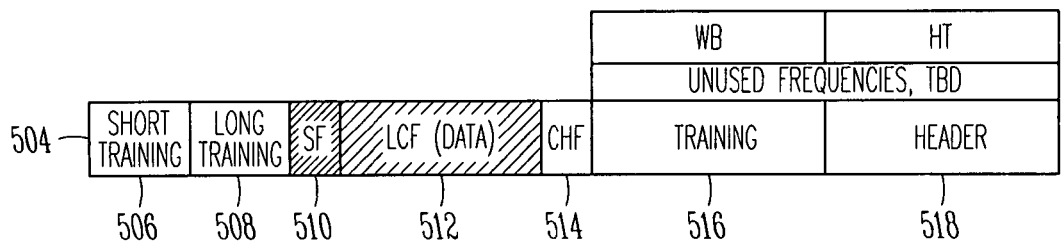

FIGS. 5A and 5B illustrate a feedback frame format in accordance with some embodiments of the present invention. Frames 502 and 504 may be used for training feedback and in some embodiments may be used for transmission of clear-to-send (CTS) frames, although the scope of the invention is not limited in this respect.

Figure 6A:
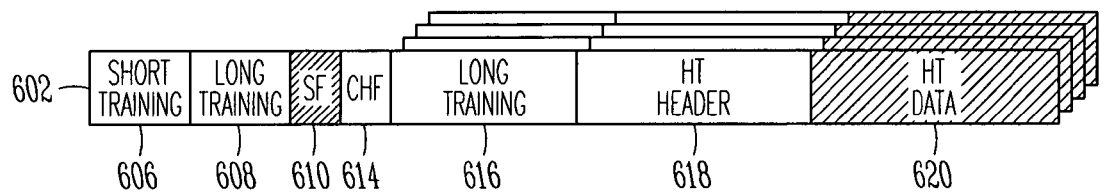
FIGS. 6A and 6B illustrate a data frame format in accordance with some embodiments of the present invention.
Figure 6B:
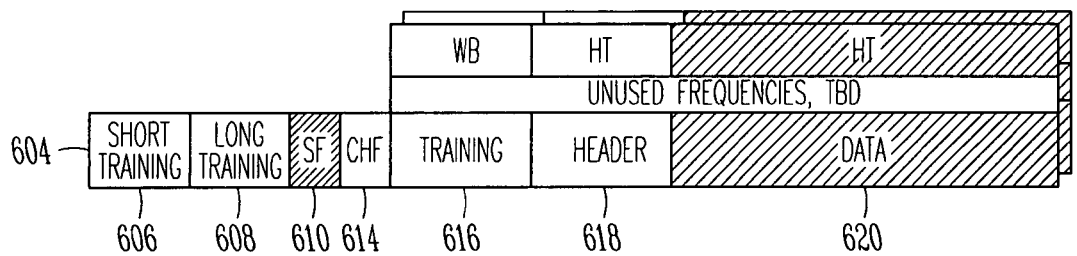

FIGS. 6A and 6B illustrate a data unit frame format in accordance with some embodiments of the present invention. Frames 602 and 604 may be used to transmit frames having a data portion, such as "data" frames, although the scope of the invention is not limited in this respect.

Figure 7:
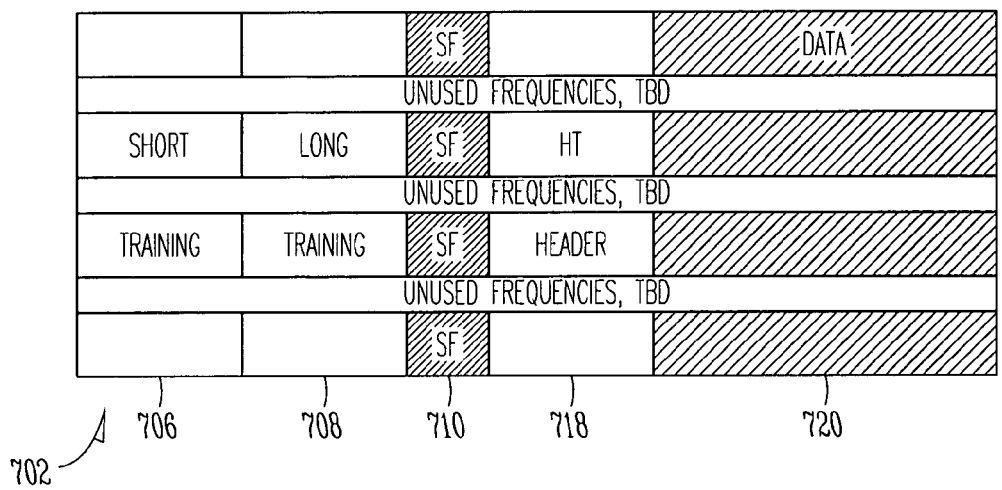
FIG. 7 illustrates a pure wideband frame format in accordance with some embodiments of the present invention.
Figure 8:
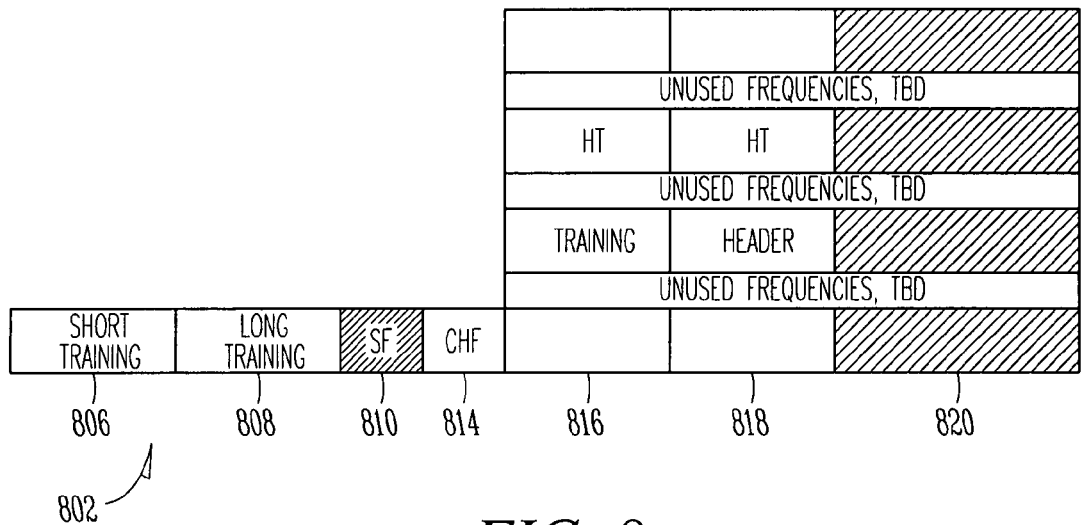
FIG. 8 illustrates a short compatibility wideband frame format in accordance with some embodiments of the present invention.
Figure 9:
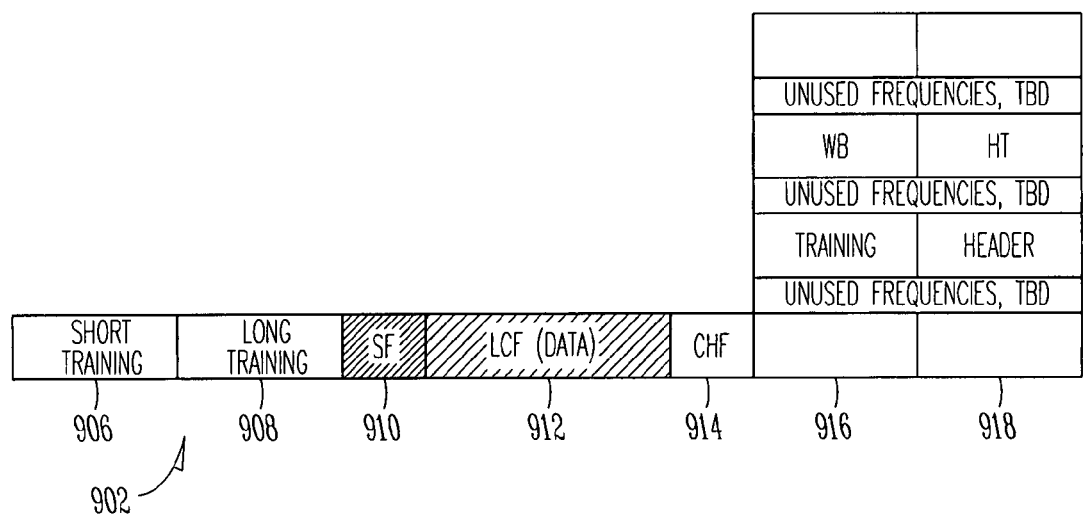
FIG. 9 illustrates a long compatibility wideband frame format in accordance with some embodiments of the present invention.

FIG. 7 illustrates a pure wideband frame format in accordance with some embodiments of the present invention. FIG. 8 illustrates a short compatibility wideband frame format in accordance with some embodiments of the present invention. FIG. 9 illustrates a long compatibility wideband frame format in accordance with some embodiments of the present invention.

Referring to FIGS. 4A through 9, frames 402, 502 and 602 illustrate frame formats that may be used with a MIMO channel comprising a single subchannel having up to four spatial subchannels. The spatial channels are illustrated in the z-direction (i.e., into the page) for some fields of frame format 602. This is described in more detail below. Frames 404, 504 and 604 illustrate frame formats that may be used with a wideband-MIMO channel comprising two or more frequency separated subchannels in which each subchannel may have two or more spatial channels. The subchannels are illustrated vertically in the y-direction for some fields of frames 404, 504 and 604 while the different spatial channels are illustrated in the z-direction. This is described in more detail below.

Frames 402, 404, 502, 504, 602, 604, 702, 802 and 902 may include a standard portion and a high-throughput portion. The standard portion may include training fields, such as training fields 406, 408, 506, 508, 606, 608, 706, 708, 806, 808, 906 and 908, a signaling field (SF), such as SFs 410, 510, 610, 710, 810 and 910. The training fields and the signaling field may comprise a short compatibility field (SCF). In some embodiments, the standard portion may also include a long compatibility field (LCF), such as LCFs 412, 512 and 912. In some embodiments, a physical layer convergence protocol (PLCP) may be used as part of the physical layer for transmissions of frames, although the scope of the invention is not limited in this respect.

In some embodiments, the SCF may be included in all frames and the presence of the LCF may depend on type of particular frame type. In some embodiments, the SCF may provide non-high-throughput communication stations (as well as high-throughput communication stations) with physical (PHY) layer carrier sense allowing non-high-throughput communication stations to determine the beginning of a high-throughput frame transmission and to determine its duration from the signaling field. In some embodiments, the standard portions of a frame may also provide non-high-throughput communication stations with medium access control (MAC) layer carrier sense. The standard portions may also be used by high-throughput communication stations to perform preliminary synchronization and channel estimation, among other things.

The high-throughput portion of the frames may include a channelization field (CHF), such as CHFs 414, 514, 614, 814 and 914, a training field, such as training fields 416, 516, 616, 816 and 916, a high-throughput header field, such as high-throughput header fields 418, 518, 618, 718, 818 and 918, and a high-throughput data field, such as high-throughput data fields 620, 720 and 820, depending on the frame type. The high-throughput portion may be used for training processes and for data transmission at high data rates. Fields in the high-throughput portion may be provided to perform high-throughput channel estimation, fine synchronization and fast-link adaptation training for WB, MIMO or WB-MIMO channels. The frequency-space configuration of the high-throughput data field may depend on the mode of operation of a high-throughput station. The type of particular high-throughput training may depend on the mode of operation and MAC type of particular frame.

The SCF may provide PHY layer compatibility with non-high-throughput communication stations. In some embodiments, the SCF may include an OFDM PLCP preamble in addition to the signal field, which may be accordance with an IEEE 802.11a standard, although the scope of the present invention is not limited in this respect. In some embodiments, the preamble may comprise short and long training symbols (e.g., 406 and 408). The SCF may provide PHY layer protection of a transmitted high-throughput frame from unwanted interferences from devices by reserving one or more subchannels at the PHY layer with the use of the length and rate parameters in the signal field for the time that covers the high-throughput data interchange.

In some embodiments, the training symbols may also be used for preliminary synchronization. During reception of the SCF, a receiving station may perform preliminary automatic gain control (AGC) convergence, timing acquisition, and/or frequency acquisition. Depending on a frame type and interfering environment, the SCF may be transmitted over the compatibility channel. In alternate embodiments, the SCF may be replicated in the frequency domain thus being transmitted over several or all the subchannels. This may reduce overhead in frame 702 for a pure WB mode.

The values of the length and the rate parameters of the SF of the SCFs may depend on the presence of the LCF. When the LCF is present in the frame, the length and rate parameters of the SCF may describe the length in octets and bit rate of the LCF. Otherwise these parameters may be chosen to cover a virtual frame with duration corresponding to the duration of the high-throughput data interchange, which may include a RTS frame, a CTS frame, a data frame (e.g., DATA) and an acknowledge (ACK) frame. In some embodiments, the SCF may be transmitted using a substantially omni-directional antenna pattern, using beamformer 113 (FIG. 1).

In some embodiments, the LCF may have a service sub-field, a physical-service data unit (PSDU) sub-field, tail bits and pad bits, and may be transmitted over the compatibility channel. When the LCF is included in a frame, it may carry the media access control (MAC) protocol data unit (MPDU). When the LCF is not included in a frame, the high-throughput portion of the frame may include the MPDU. The LCF may be used for transmission of frames of MAC type control and management and may carry the appropriate MPDU. For frames of MAC type "data", the LCF may also be used to carry an MPDU (e.g., in compatibility mode of operation), although the scope of the invention is not limited in this respect.

In some embodiments, the LCF may provide MAC layer protection of a transmitted high-throughput OFDM frame from unwanted interferences from other devices by setting their network allocation vector (NAV) to cover the high-throughput data interchange. When the LCF is present in a packet, the length and rate values in the signal field of the SCF may be set to indicate data rate and PSDU length transmitted in the LCF. In some embodiments, the LCF may be transmitted with a substantially omni-directional antenna pattern, using beamformer 113 (FIG. 1), although the scope of the invention is not limited in this respect.

In some embodiments, the CHF may indicate the frequency-space configuration of the physical protocol data unit (PPDU) transmitted after it. The encoding of the CHF on a single OFDM symbol may be performed with rotated BPSK modulation 302 (FIG. 3) of the subcarriers. The rotated BPSK modulation may allow high-throughput stations to distinguish frames of different formats.

In some embodiments, the CHF may include a channelization mask, which may be a 4-bit mask describing the subchannels used. In some embodiments, each "1" in the mask may indicate a corresponding subchannel. In some embodiments, a first element in the mask may correspond to a subchannel with a lowest frequency. In some embodiments, the CHF may also include a parameter to indicate the number of transmit antennas used. In some embodiments, this parameter may comprise a two-bit unsigned integer. In some embodiments, the CHF may also include a parameter to indicate the number of spatial channels used. In some embodiments, this parameter may comprise a two-bit unsigned integer.

In some embodiments, the CHF may also include a parameter to indicate the high-throughput training type. In some embodiments, this parameter may comprise one bit indicating whether the high-throughput training type is for the MIMO mode or the WB mode. When the number of spatial channels used parameter indicates that more than one spatial channel is used and WB training is indicated, spatial channel training may be performed. Examples of spatial channel training are described in more detail below with reference to FIG. 10. In some embodiments, the CHF may also include a parameter to indicate the modulation of the high-throughput header. In some embodiments, this parameter may comprise a parameter indicating whether BPSK, QPSK, 16-QAM, or 64-QAM modulation, for example, is used in the high-throughput header.

In a pure WB operational mode, the SCF of frame 702 may be initially transmitted over more then one subchannel to indicate the busy subchannels, and the CHF of frame 702 may be omitted because the frequency channelization may be implicit by which subchannels the SCF is received on and MIMO information may not be needed. In some embodiments, a high-throughput receiving station may perform detection of the CHF to distinguish frames of pure WB formats and frames WB-MIMO format.

The high-throughput training fields, such as high-throughput training fields 416, 516, 616, 816 and 916, may be used to allow a receiving station perform channel acquisitions. The high-throughput training fields may include different training sequences depending on modes of operation (e.g., WB mode, MIMO mode or WB-MIMO mode).

The WB training fields, such as WB training fields 516, 616, 816 and 916 (FIG. 9) may be used by high-throughput stations to estimate the channel transfer function of single spatial subchannels. In some embodiments, each subchannel may be used for the transmission a long training sequence, which may be in accordance with the IEEE Std.802.11a, although the scope of the invention is not limited in this respect. In some embodiments, the phase of each subcarrier used for a long training sequence may be rotated by an angle that may depend on the frequency channelization. This phase rotation may reduce the peak-to-average power ratio (PAPR).

The following table (Table 1) lists examples of phase angles for rotating the phase of long training sequences of the WB training fields.

TABLE 1

| Frequency channelization | Phase rotation |
| --- | --- |
| 4 contiguous subchannels | Rotate phase in upper channel by approximately 180 degrees |
| 3 contiguous subchannels | Rotate phase in one channel by approximately 90 degrees clockwise |
| 2 contiguous subchannels | Rotate phase in upper channel by approximately 90 degrees clockwise |
| 1 contiguous subchannel | No phase rotation |
| Non-contiguous channelization | Implementation dependent |

MIMO initial training fields 416 (FIGS. 4A and 4B) may be used by a receiving station to estimate a channel matrix for channels between each transmitting antenna used by a transmitting station, such as transmitting station 100 (FIG. 1), and each receiving antenna used by a receiving station. In some embodiments, the receiving station may calculate transmit and receive beamforming coefficients and may utilize a beamformer to form orthogonal spatial channels. MIMO initial training symbols may be determined from high-throughput training symbols with certain channelization. In some embodiments, subcarriers of the WB training symbols may be spread between the transmitting antennas. The number of WB training symbols in the MIMO initial training fields may be equal to the number of transmitting antennas, although the scope of the invention is not limited in this respect.

In some embodiments, a high-throughput header (e.g., high-throughput headers 418, 518, 618, 718, 818 and 918) may include parameters for fast link adaptation, WB mode operation and MIMO mode operation. Depending on operational mode and particular frame type, the high-throughput header may include different sets of parameters and may have a different length. The actual set of parameters transmitted in the high-throughput header may be indicated in a parameter mask that may be transmitted first in the high-throughput header. In some embodiments, the set of parameters may depend on the format of the frame and may be signaled in a frame type indicator. In some embodiments, the high-throughput header may be a high-throughput PLCP header, although the scope of the invention is not limited in this respect.

In some embodiments, a parameter mask of the high-throughput header may indicate the presence of the particular fields in the high-throughput header. In some embodiments, the parameter mask of the high-throughput header may be a 14-bit length mask, although this is not a requirement. Table 2 (illustrated below) shows examples for particular bits in the parameter mask in accordance with some embodiments of the present invention. In some embodiments, each "1" in the mask may indicate that the corresponding field is present in the high-throughput header, and bit 1 may indicate the presence of the high-throughput data field in the data unit. In some embodiments, the parameter mask may be provided with a cyclic redundancy check (CRC) and tail bits to allow it to be decoded separately from other portions of the header.

TABLE 2

Parameter Mask for the high-throughput header.

| Bit # | Presence of corresponding parameter |
|---|---|
| 0 | high-throughput data field in the data unit |
| 1 | Bit loading per subchannel |
| 2 | Power loading per subchannel |
| 3 | Coding Rate |
| 4 | Length |
| 5 | Transmit Power level |
| 6 | Available Transmit power level |
| 7 | Frequency channelization request |
| 8 | Number of spatial subchannels request |
| 9 | Bit loading per subchannel request |
| 10 | Power loading per subchannel request |
| 11 | Coding Rate Request |
| 12 | Transmit Power request |
| 13 | Beamforming request |
| 14 | Duration recommendation |

In some embodiments, the parameter mask of the high-throughput header may not need to describe the presence of a CRC for the entire header, a header tail and pad bit fields. In some embodiments, the parameter mask may also not need to indicate the presence of a service parameter, which may be determined by the presence of a high-throughput data field to follow (e.g., indicated by bit #0).

In some embodiments, the bit loading per subchannel (indicated by bit #1) may be represented by an array of unsigned integers that may describe the modulation type for each spatial/frequency subchannel used for transmission. The modulation types may be described for channels that are indicated by the frequency channelization parameter and number of spatial subchannels in the CHF. In some embodiments, the subchannels may be assigned numerals from lower to higher frequency and from the first to the last spatial subchannel. An example of this is illustrated in FIG. 2.

In some embodiments, power loading per subchannel may be performed. In these embodiments, the power loading (indicated by bit #2) may be represented by an array of unsigned integers that may describe the power loading for each spatial/frequency subchannel which may be applied during transmission of a response packet. The power levels may be described for channels that are indicated by the frequency channelization parameter and number of spatial subchannels in the CHF. The numeration of subchannels may be done from lower to higher frequencies and from a first to a last spatial subchannel, although the scope of the present invention is not limited in this respect.

In some embodiments, the coding rate (indicated by bit #3) may indicate the coding rate for error-correcting coding used by encoder 102 (FIG. 1) for encoding the current data unit. In some embodiments, the length (indicated by bit #4) may be an unsigned integer that indicates the number of octets in the data unit that the MAC layer is currently requesting the PHY layer to transmit. This value may be used by the PHY layer to determine the number of octet transfers that may occur between the MAC layer and the PHY layer after receiving a request to start transmission, although the scope of the present invention is not limited in this respect.

In some embodiments, the transmit power level parameter (indicated by bit #5) may be an unsigned integer that may indicate the power level at which the current packet is transmitted. In some embodiments, the power level may be described with 3 dB steps down from the maximal available value indicated by available transmit power level parameter, although the scope of the present invention is not limited in this respect. In some embodiments, he available transmit power level (indicated by bit #6) may be unsigned integer and may indicate the maximum power level for a transmitting station at which the packet may be transmitted, although the scope of the invention is not limited in this respect.

In some embodiments, the frequency channelization request (indicated by bit #7) may include a bit mask of standard subchannels that may be used for transmission of a response packet. The length of this parameter may be four bits. Each "1" in this bit mask may request a corresponding subchannel to be used for response transmission, although the scope of the invention is not limited in this respect.

In some embodiments, the number of spatial subchannels request (indicated by bit #8) may indicate the number of spatial subchannels to be used during transmission of response packet. The bit loading per subchannel request (indicated by bit #9) may be an array of unsigned integers that may describe the modulation type per each subchannel to be applied during transmission of response packet. The modulation types may be requested for the subchannels that are requested to be used by the frequency channelization request and the number of spatial subchannels request parameters, although the scope of the invention is not limited in this respect.

In some embodiments, power loading per subchannel request (indicated by bit #10) may be an array of unsigned integers that may request the power level per each subchannel to be applied during transmission of response packet. The power levels may be requested for all channels that are requested to be used by frequency channelization request and number of spatial subchannels request parameters. In some embodiments, the subchannels may be assigned numerals from lower to higher frequencies and from a first to a last spatial subchannel, although the scope of the invention is not limited in this respect.

In some embodiment, the coding rate request (indicated by bit #11) may indicate the coding rate to be used in the response packet, although the scope of the invention is not limited in this respect. In some embodiments, the transmit power request (indicated by bit #12) may be unsigned integer that may request the overall power level at which the response packet is requested to be transmitted. The power level may be described with 3 dB steps down from the maximal available value, although the scope of the invention is not limited in this respect.

In some embodiments, the beamforming request (indicated by bit #13) may include a transmit beamforming matrix. The matrix may include weighting coefficients for the subcarriers (or groups of subcarriers) of the subchannels requested by the channelization request parameter. In some embodiments, the size of this parameter may be calculated at the receiving station from the value of the number of spatial subchannels request parameter, although the scope of the invention is not limited in this respect.

In some embodiments, the duration recommendation (indicated by bit #14) may be unsigned integer and may include a recommended duration of the response packet, which may be in units of 200 microseconds, although the scope of the invention is not limited in this respect.

In some embodiments, a service field that may be a scrambler initialization may also be included and may be present in a frame when the high-throughput data field is present. In some embodiments, the CRC may be calculated over all preceding fields starting from parameter mask. In some embodiments, the header tail may be set to zero and may be used to drive the encoder into a zero state. Header pad bits may be used to fill the last OFDM symbol of the high-throughput header, although the scope of the invention is not limited in this respect.

Referring to FIG. 7, frames 702 of a pure WB frame format may be useful in networks with high-throughput communication stations, (e.g., when no overlap with non-high-throughput stations). In these embodiments, frames of almost any MAC type may be transmitted in pure WB frame format. The pure WB frame format may have less overhead than other frame formats, and may include some of the same fields as other frame formats, including training fields 706 and 708, SF 710, high-throughput header 718 and high-throughput data field 720. In some embodiments, the SCF may allow channel estimation in the subchannels, as well as timing synchronization, and frequency offset estimation on the fly.

In some embodiments, SF 710 may be multiplied in frequency domain with a predetermined channelization, LCF 712, CHF 714, and high-throughput training field 716 may be absent from frames of pure WB frame format 702. In some embodiments, high-throughput header 718 of pure WB frame format 702, for RTS and data frames, may include:
Bit loading per subchannel
Power loading per subchannel
Coding Rate
Length
Transmit Power level
Available Transmit Power level
CRC
Tail In some embodiments, high-throughput header 718 for CTS and ACK frames may include:
Bit loading per subchannel
Power loading per subchannel
Coding Rate
Length
Transmit Power level
Available Transmit Power level
Bit loading per subchannel request
Power loading per subchannel request
Coding Rate Request
Transmit Power Request
Duration Recommendation
CRC
Tail In some embodiments, high-throughput data field 720 may also be present in frame 702 for CTS and ACK frames, although the scope of the invention is not limited in this respect.

Referring to FIG. 8, frame 802 of short compatibility WB frame format may be used by high-throughput stations when there may be no need to provide MAC layer compatibility with non-high-throughput communication stations. In some embodiments, this format may be used when physical layer compatibility (i.e., carrier sense) may be needed but MAC level compatibility is not necessarily required. For example, it may only be necessary to transmit data frames. For RTS and CTS like frames, long compatibility frame format 902 (FIG. 9) may also be suitable.

In some embodiments, short compatibility WB frame format 802 may include training fields 806 and 808, SF 810 and CHF 814 which may be transmitted over the compatibility channel. In some embodiments, LCF may be absent in short compatibility WB frame format 802.

In some embodiments, CHF 814 may include:
Frequency channelization which may indicate the channelization used in high-throughput part of frame 802.
The number of spatial channels may equal one.
The number of transmit antennas may indicate the actual number of transmit antennas used.
The high-throughput training type may indicate WB training.
High-throughput header modulation may indicate BPSK.

In some embodiments, high-throughput training field 816 may include WB training with channelization indicated by frequency channelization parameter in CHF 814, although the scope of the invention is not limited in this respect.

In some embodiments, high-throughput header 818 may include parameters for a data frame and may include:
Bit loading per subchannel
Power loading per subchannel
Coding Rate
Length
Transmit Power level
Available Transmit Power level
CRC
Tail In some embodiments, high-throughput data field 820 may be present in packets that carry an MPDU, although the scope of the invention is not limited in this respect.

Referring to FIG. 9, frame 902 of long compatibility frame format may be used to transmit frames of MAC type control (e.g., RTS, CTS and ACK frames) and some of types of data frames. Long compatibility frame format may include training fields 906 and 908, SF 910 and LCF 912 which may be transmitted over the compatibility channel and a short high-throughput part comprising WB training field 916 and high-throughput header 918. Long compatibility frame format may be understandable at the MAC layer by non-high-throughput communication stations, and at the same time, long compatibility frame format 902 may provide training capability for high-throughput communication stations.

In some embodiments, SF 910 may indicate the rate used in LCF 912 and may indicate the length of LCF 912. In some embodiments, the MPDU may be included in the LCF 902. CHF 914 may include the following parameters:
Frequency Channelization to indicate the channelization used for high-throughput part of frame.
The number of spatial channel may equal one.
The number of transmit antennas may indicate the actual number of transmit antennas
The high-throughput training type may indicate WB training.
High-throughput header modulation may indicate BPSK modulation.
CRC
Tail In some embodiments, WB training field 916 may indicate WB training with channelization indicated by frequency channelization parameter in CHF 914, although the scope of the invention is not limited in this respect.

In some embodiments, high-throughput header 918 may include the following parameters for an RTS frame:
  Transmit Power level
  Available Transmit Power level
  CRC
  Tail I some embodiments, high-throughput header 908 may include the following parameters for CTS and ACK frames:
  Bit loading per subchannel request
  Power loading per subchannel request
  Coding Rate Request
  Transmit Power Request
  Duration Recommendation In some embodiments, a high-throughput data field may be absent in frame format 902, although the scope of the invention is not limited in this respect.

Referring to FIGS. 4A and 4B, frames 402 and 404 of initial MIMO training frame formats may be used for channel matrix measurement to determine spatial channels. Initial MIMO training frame formats may be used for transmission of RTS frames. In some embodiments, SF 410 may be transmitted over the compatibility channel. SF 410 may indicate the rate used in LCF 412 and may indicate the length of LCF 412. LCF 412 may also be transmitted over the compatibility channel, and may include the MPDU. In some embodiments, CHF 414 may include the following parameters:
  Frequency channelization may indicate the channelization of high-throughput training field, which, in some embodiments, may be up to two subchannels.
  The number of spatial channels equal one.
  The number of transmit antennas may indicate the actual number of transmit antennas used for transmission.
  High-throughput training type may indicate MIMO training.
  High-throughput header modulation may indicate BPSK modulation.

In some embodiments, high-throughput training field 416 may be initial MIMO training for frame format 402, which may be needed to estimate a channel matrix, although the scope of the invention is not limited in this respect. Using information from high-throughput header 418 together with an estimated channel matrix, spatial subchannels may be determined, and transmit and receive beamforming coefficients may also be calculated. The channelization of field 416 may be indicated by the frequency channelization parameter in CHF 414.

In some embodiments, high-throughput header 418 may be transmitted over the compatibility channel regardless of channelization of high-throughput training field 416, using same antenna pattern as the SCF and LCF 412, although the scope of the invention is not limited in this respect. In some embodiments, high-throughput header 418 may include the following parameters for RTS frames:
  Transmit Power level
  Available Transmit Power level
  CRC
  Tail In some embodiments, a high-throughput data field may be absent for RTS frames of the initial MIMO training format, although the scope of the invention is not limited in this respect.

Referring to FIGS. 5A and 5B, training feedback MIMO frame formats 502 and 504 may be used for transmission of CTS frames between MIMO-capable stations. In some embodiments, the SCF may be transmitted over the compatibility channel. SF 510 may indicate the rate used in LCF 512 and may indicate the length of LCF 512. LCF 512 may also be transmitted over the compatibility channel, and may include the MPDU. In some embodiments, CHF 514 may include the following parameters:
  Frequency channelization may indicate the channelization of high-throughput part of frame.
  The number of spatial channels may be one.
  The number of transmit antennas may indicate the actual number of transmit antennas used.
  High-throughput training type may indicate WB training.
  High-throughput header modulation may indicate either BPSK or QPSK modulation.

In some embodiments, high-throughput training field 516 may include WB training field and may be transmitted with the channelization indicated by the frequency channelization parameter in CHF 514, although the scope of the invention is not limited in this respect.

In some embodiments, high-throughput header 518 may be modulated with BPSK, however, if stations plan using only the compatibility channel for communication in MIMO mode, an inverse MRC technique may be used by transmitter to increase SNR at the receiving antennas thus allowing QPSK modulation of high-throughput header field 518, although the scope of the invention is not limited in this respect.

In some embodiments, high-throughput header parameters for CTS frames may include:
  Transmit power level
  Available transmit power level
  Number of spatial channels request
  Bit loading per subchannel request
  Power loading per subchannel request
  Beamforming request
  Coding rate request
  Transmit power request
  Duration recommendation
  CRC
  Tail In some embodiments, high-throughput data filed may be absent in CTS frames, although the scope of the invention is not limited in this respect.

Referring to FIGS. 6A and 6B, high-throughput MIMO frame formats 602 and 604 may be suitable for use by MIMO-capable stations to transmit data frames. Receiving and transmitting stations using high-throughput MIMO frame formats 602 and 604 may determine beamforming patterns for use in decoupling the spatial channels. In order to refine the channel estimation per spatial subchannel, WB training may be sent over each spatial subchannel prior to high-throughput header 618. In some embodiments, the SCF may be transmitted over the compatibility channel with a substantially omnidirectional antenna pattern, and the LCF may be absent. In some embodiments, CHF 614 may include the following parameters:
  Frequency channelization to indicate used channelization of high-throughput part of frame.
  The number of spatial channels may indicate the number of used spatial channels.
  The number of transmit antennas may indicate the actual number of transmit antennas used.
  High-throughput training type may indicate WB training.

High-throughput header modulation may indicate BPSK modulation.

In some embodiments, high-throughput training may be used to perform WB training in each spatial channel. The frequency channelization of training is indicated by the frequency channelization parameter in CHF 614, although the scope of the invention is not limited in this respect.

In some embodiments, high-throughput header 618 may include the following parameters for a data frame.

Bit loading per subchannel
Coding rate
length
Transmit power level
Available transmit power level
CRC
Tail In some embodiments, high-throughput data field 620 may be transmitted over several spatial subchannels simultaneously. The bit and power loading for each frequency-space subchannel may be indicated by corresponding parameters in high-throughput header 618, although the scope of the invention is not limited in this respect.

Figure 10:
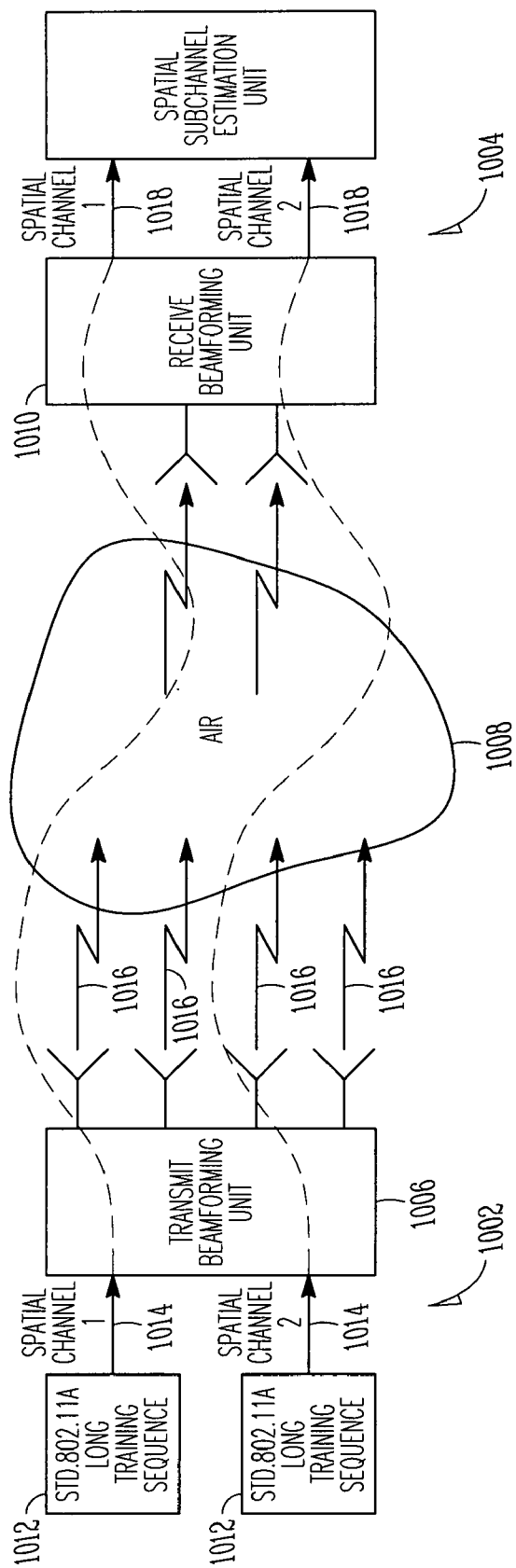
FIG. 10 illustrates spatial channel training for transmission of long training sequences through spatial channels in accordance with some embodiments of the present invention.

FIG. 10 illustrates spatial channel training for transmission of long training sequences through spatial channels in accordance with some embodiments of the present invention. Spatial channel training may be used to achieve orthogonality between spatial channels of a particular subchannel. In these embodiments, spatial channel training may be used to estimate and decouple data streams on receive spatial channels 1018 at receiving station 1004 that were separately transmitted on transmit spatial channels 1014 at transmitting station 1002. Receiving station 1004 may estimate the channel which may include coefficients used by transmit beamforming unit 1006, signals 1016 received from the corresponding transmit antennas, the effects of air environment 1008 on signals 1016 and the coefficients used by receive beamforming unit 1010. In some embodiments, the channel estimation may include sending training sequences 1012 through each of spatial subchannels 1014 in one or more separate frequency subchannels. In some embodiments, orthogonal MIMO initial training fields 616 (FIGS. 6A and 6B) may be used for transmission of the training sequences, although the scope of the invention is not limited in this respect. In some embodiments, transmitting station 1002 may correspond to transmitting station 100 (FIG. 1).

Figure 11:
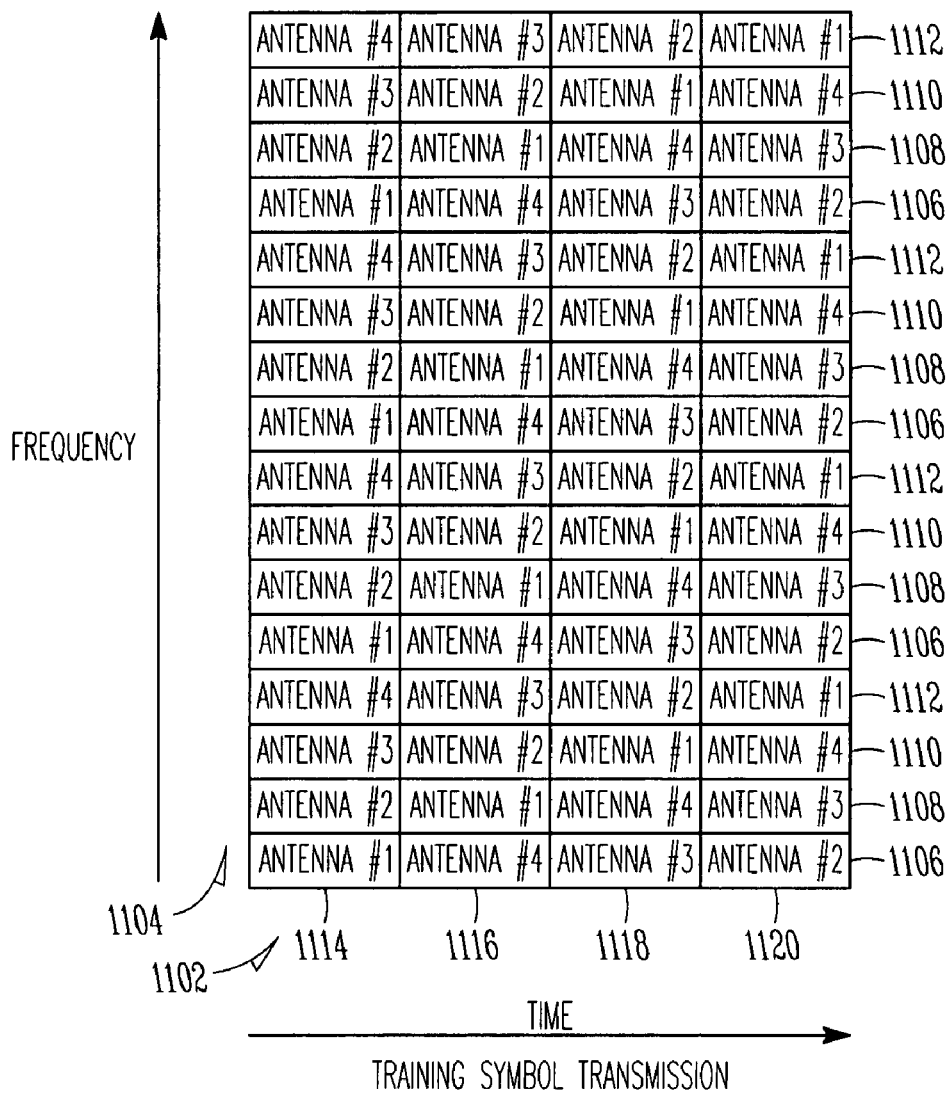
FIG. 11 illustrates training symbol transmission in accordance with some embodiments of the present invention.

FIG. 11 illustrates initial training symbol transmission in accordance with some embodiments of the present invention. Initial MIMO training may comprise training symbols 1100 spread among transmitting antennas during transmission of MIIMO initial training fields, such as fields 416 (FIGS. 4A and 4B). In some embodiments, the training symbols may be transmitted on some subcarriers 1104 and on certain antennas during time intervals 1102. For example, training symbols for a first antenna (e.g., antenna #1) may be transmitted on a first group of subcarriers 1106 during first time interval 1114, training symbols for the first antenna may then be transmitted on a second group of subcarriers 1108 during second time interval 1116, training symbols for the first antenna may then be transmitted on a third group of subcarriers 1110 during third time interval 1118, and training symbols for the first antenna may then be transmitted on a fourth group of subcarriers 1112 during fourth time interval 1120. The four groups of subcarriers may together comprise all the subcarriers of a subchannel. This pattern may be repeated for each transmit antenna as illustrated.

In some embodiments, MIMO initial training may be used by a receiving station to estimate channel matrix from each transmitting antenna on the transmit side of the channel to each receiving antenna on the receive side of the channel. In some embodiments, based on the channel matrix, the receiving station may calculate transmit and receive beamforming coefficients for up to four spatial channel-subchannel combinations. In some embodiments, the MIMO initial training symbols may comprise WB training symbols with certain channelization and the subcarriers of WB training symbols may be spread between transmitting antennas, an example, of which is as illustrated in FIG. 11. In some embodiments, the number of OFDM symbols in MIMO initial training may equal the number of transmitting antennas, although the scope of the invention is not limited in this respect.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A method of communicating over a high-throughput communication channel comprising:

transmitting a channelization field as part of a current data unit, the channelization field indicating a frequency and space configuration of subsequent portions of the current data unit; and transmitting a high-throughput training field in accordance with the frequency and space configuration indicated in the channelization field, the high-throughput training field to be used by a receiving station to estimate a channel matrix of the high-throughput communication channel, wherein the channelization field indicates whether the high-throughput communication channel is a wideband channel, the wideband channel comprising a concurrent use of two or more valid operating channels, and wherein when the channelization field indicates that the high-throughput communication channel is a wideband channel, the channelization field indicates which of the two or more valid operating channels comprise the wideband channel.

2. The method of claim 1 wherein each of the valid operating channels comprise a single subchannel, and wherein the channelization field further indicates whether the high-throughput communication channel comprises:

a multiple-input-multiple-output (MIMO) channel comprising a single subchannel having between two and four spatial subchannels with up to four distinct data streams transmitted thereon; or a wideband-MIMO channel comprising a concurrent use of two or more frequency separated subchannels wherein each subchannel has two or more spatial channels, wherein the spatial channels comprise non-frequency-orthogonal channels associated with a signal subchannel in which orthogonality between the spatial channels is achieved by antenna diversity.

3. The method of claim 2 wherein the wideband MIMO channel has a wideband channel bandwidth of between 40 and 80 MHz and comprises between two and four of the subchannels, wherein the subchannels are non-overlapping orthogonal frequency division multiplexed channels, wherein each subchannel has a subchannel bandwidth of approximately 20 MHz and comprises a plurality of orthogonal subcarriers, and wherein the spatial channels are non-orthogonal frequency channels associated with one of the subchannels whose orthogonality is achieved by beamforming and antenna diversity.

4. The method of claim 2 wherein the spatial channels are generated with a plurality of transmit antennas of a transmitting station performing the transmitting, each spatial channel carrying a separate data portion of a data unit comprising an orthogonal frequency-division multiplexed symbol.

5. The method of claim 2 wherein each subchannel comprises a plurality of orthogonal frequency division multiplexed subcarriers, and wherein each orthogonal frequency division multiplexed subcarrier has a null at substantially a center frequency of the other subcarriers to achieve substantial orthogonality between the subcarriers of the associated subchannel.

6. The method of claim 2 wherein the channelization field is transmitted on a compatibility channel, the compatibility channel comprising a single subchannel with one or more spatial channels; and wherein the transmitting the channelization field comprises transmitting the channelization field on the compatibility channel with a rotated binary phase shift keying (BPSK) modulation of subcarriers of the compatibility channel.

7. The method of claim 6 wherein the rotated BPSK modulation comprises phase shifting RE signals by substantially either +90 or −90 degrees in response to bits of a digital bit stream representing data comprising the channelization field.

8. The method of claim 6 wherein the rotated BPSK modulation comprises rotating a symbol constellation representing data comprising the channelization field substantially by either +90 or −90 degrees from symbol constellation of conventional BPSK modulation.

9. The method of claim 6 further comprising encoding a digital bit stream representing data comprising the channelization field with a code rate of ½ prior to rotating the BPSK modulation and transmitting the channelization field of the current data unit.

10. A method of communicating over a high-throughput communication channel comprising:

transmitting a channelization field as part of a current data unit, the channelization field indicating a frequency and space configuration of subsequent portions of the current data unit; and transmitting a high-throughput training field in accordance with the frequency and space configuration indicated in the channelization field, the high-throughput training field to be used by a receiving station to estimate a channel matrix of the high-throughput communication channel, wherein the channelization field indicates whether the high-throughput communication channel comprises one of:

a wideband channel having up to four frequency separated subchannels;

a multiple-input-multiple-output (MIMO) channel comprising a single subchannel having up to four spatial subchannels with up to four distinct data streams transmitted thereon; and a wideband-MIMO channel comprising two or more frequency separated subchannels wherein each subchannel has two or more spatial channels, wherein transmitting the channelization field comprises transmitting:

a channelization mask to indicate which subchannels are used when transmitting subsequent portions of the current data unit;

transmit antenna bits to indicate a number of transmit antennas used when transmitting the subsequent portions of the current data unit;

spatial channel bits to indicate a number of spatial channels used when transmitting the subsequent portions of the current data unit;

a high-throughput training type bit to indicate whether the wideband or the MIMO channel is to be estimated; and a header modulation bit to indicate a modulation type used for a subsequently transmitted field of the current data unit.

11. The method of claim 1 further comprising transmitting a physical layer convergence protocol (PLCP) header field after the channelization field modulated in accordance with a modulation type indicated in the channelization field, wherein the PLCP header field comprises a mask to indicate fields of the PLCP header field, the fields including at least some of: a bit-loading per subchannel, a coding rate, a length, a transmit power level, an available transmit power level, a frequency channelization request, a number of spatial channels request, a bit loading subchannel request, a power loading per subchannel request, a coding rate request, a transmit power request, and a duration recommendation.

12. A transmitter comprising:
RF circuitry to transmit a channelization field on a compatibility subchannel; and
modulators to modulate a digital bit stream representing the channelization field with a rotated binary phase shift keying (BPSK) modulation of subcarriers of the compatibility channel,
wherein the channelization field is part of a current data unit and indicates a frequency and space configuration of subsequent portions of the current data unit,
wherein the channelization field indicates whether a high-throughput communication channel used for transmitting the subsequent portions of the current data unit is a wideband channel, the wideband channel comprising a concurrent use of two or more valid operating channels, and
wherein when the channelization field indicates that the high-throughput communication channel is a wideband channel, the channelization field indicates which of the two or more valid operating channels comprise the wideband channel.

13. The transmitter of claim 12 wherein each of the valid operating channels comprise a single subchannel,
wherein the channelization field further indicates whether the high-throughput communication channel comprises:
a MIMO channel comprising a single subchannel having between two and four spatial subchannels, with up to four distinct data streams transmitted thereon; or
a wideband-MIMO channel comprising a concurrent use of two or more frequency separated subchannels wherein each subchannel has two or more spatial channels,
wherein the spatial channels comprise non-frequency-orthogonal channels associated with a signal subchannel in which orthogonality between the spatial channels is achieved by antenna diversity.

14. The transmitter of claim 13 wherein the wideband MIMO channel has a wideband channel bandwidth of between 40 and 80 MHz and comprises between two and four of the subchannels,
wherein the subchannels are non-overlapping orthogonal frequency division multiplexed channels,
wherein each subchannel has a subchannel bandwidth of approximately 20 MHz and comprises a plurality of orthogonal subcarriers, and
wherein the spatial channels are non-orthogonal frequency channels associated with one of the subchannels whose orthogonality is achieved by beamforming and antenna diversity.

15. The transmitter of claim 13 wherein the spatial channels are generated with a plurality of transmit antennas of a transmitting station performing the transmitting, and
wherein each spatial channel carries a separate data portion of a data unit comprising an orthogonal frequency division multiplexed symbol.

16. The transmitter of claim 13 wherein each subchannel comprises a plurality of orthogonal frequency division multiplexed subcarriers, and
wherein each orthogonal frequency division multiplexed subcarrier has a null at substantially a center frequency of the other subcarriers to achieve substantial orthogonality between the subcarriers of the associated subchannel.

17. The transmitter of claim 13 wherein the rotated BPSK modulation is generated by the modulator, the modulator to phase shift RF signals by substantially either +90 or −90 degrees in response to bits of a digital bit stream representing data comprising the channelization field.

18. The transmitter of claim 13 wherein the rotated BPSK modulation is generated by the modulator, the modulator to rotate a symbol constellation representing data comprising the channelization field substantially by either +90 or −90 degrees from symbol constellation of conventional BPSK modulation.

19. The transmitter of claim 13 further comprising an encoder to encode a digital bit stream representing data comprising the channelization field with a code rate of ½ prior to the modulator to rotate the BPSK modulation.

20. A transmitter comprising:
RF circuitry to transmit a channelization field on a compatibility subchannel; and
modulators to modulate a digital bit stream representing the channelization field with a rotated binary phase shift keying (BPSK) modulation of subcarriers of the compatibility channel,
wherein the channelization field is part of a current data unit and indicates a frequency and space configuration of subsequent portions of the current data unit,
wherein the channelization field indicates whether the high-throughput communication channel comprises one of:
a wideband channel having up to four frequency separated subchannels;
a MIMO channel comprising a single subchannel having up to four spatial subchannels, with up to four distinct data streams transmitted thereon; and
a wideband-MIMO channel comprising two or more frequency separated subchannels wherein each subchannel has two or more spatial channels,
wherein the channelization field comprises:
a channelization mask to indicate which subchannels are used when transmitting subsequent portions of the current data unit;
transmit antenna bits to indicate a number of transmit antennas used when transmitting the subsequent portions of the current data unit;
spatial channel bits to indicate a number of spatial channels used when transmitting the subsequent portions of the current data unit;
a high-throughput training type bit to indicate whether the wideband or the MIMO channel is to be estimated; and
a header modulation bit to indicate a modulation type used for a subsequently transmitted field of the current data unit.

21. The transmitter of claim 13 wherein the RF circuitry further transmits a physical layer convergence protocol (PLCP) header field after the channelization field modulated by the modulators in accordance with a modulation type indicated in the channelization field,
wherein the PLCP header field comprises a mask to indicate fields of the PLCP header field, the fields including at least some of: a bit-loading per subchannel, a coding rate, a length, a transmit power level, an available transmit power level, a frequency channelization request, a number of spatial channels request, a bit loading subchannel request, a power loading per subchannel request, a coding rate request, a transmit power request, and a duration recommendation.

22. A method comprising:
generating a signal having a frame structure for a data unit comprising:
a channelization field to indicate a frequency and space configuration of subsequent portions of the current data unit of a high-throughput communication channel; and
a high-throughput training field in accordance with the frequency and space configuration indicated in the channelization field, the high-throughput training field to be used by a receiving station to estimate a channel matrix of the high-throughput communication channel,
wherein the channelization field indicates whether the high-throughput communication channel is a wideband channel, the wideband channel comprising a concurrent use of two or more valid operating channels, and
wherein when the channelization field indicates that the high-throughput communication channel is a wideband channel, the channelization field indicates which of the two or more valid operating channels comprise the wideband channel.

23. The method of claim 22 wherein each of the valid operating channels comprise a single subchannel,
wherein the channelization field further indicates whether the high-throughput communication channel comprises:
a MIMO channel comprising a single subchannel having between two and four spatial subchannels, with up to four distinct data streams transmitted thereon; or
a wideband-MIMO channel comprising two or more frequency separated subchannels wherein each subehannel has two or more spatial channels,
wherein the spatial channels comprise non-frequency-orthogonal channels associated with a signal subchannel in which orthogonality between the spatial channels is achieved by antenna diversity.

24. A method comprising:
generating a signal having a frame structure for a data unit comprising:
a channelization field to indicate a frequency and space configuration of subsequent portions of the current data unit; and
a high-throughput training field in accordance with the frequency and space configuration indicated in the channelization field, the high-throughput training field to be used by a receiving station to estimate a channel matrix of the high-throughput communication channel,
wherein the channelization field indicates whether the high-throughput communication channel comprises one of:
a wideband channel having up to four frequency separated subchannels;
a MIMO channel comprising a single subehannel having up to four spatial subhannels, with up to four distinct data streams transmitted thereon; and
a wideband-MIMO channel comprising two or more frequency separated subchannels wherein each subehannel has two or more spatial channels,
wherein the channelization field comprises a rotated binary phase shift keying (BPSK) modulation of subcarriers of a compatibility channel, and
wherein the channelization field comprises:
a channelization mask to indicate which subchannels are used when transmitting subsequent portions of the current data unit;
transmit antenna bits to indicate a number of transmit antennas used when transmitting the subsequent portions of the current data unit;
spatial channel bits to indicate a number of spatial channels used when transmitting the subsequent portions of the current data unit;
a high-throughput training type bit to indicate whether the wideband or the MIMO channel is to be estimated; and
a header modulation bit to indicate a modulation type used for a subsequently transmitted field of the current data unit.

25. The method of claim 23, wherein the frame structure further comprises a header field comprising a mask to indicate fields of the header field, the fields including at least some of: a bit-loading per subchannel, a coding rate, a length, a transmit power level, an available transmit power level, a frequency channelization request, a number of spatial channels request, a bit loading subchannel request, a power loading per subchannel request, a coding rate request, a transit power request, and a duration recommendation.

26. A computer-readable medium storing instructions, which when executed by one or more processors, cause the processors to perform operations comprising:
generating a channelization field as part of a current data unit, the channelization field indicating a frequency and space configuration of subsequent portions of the current data unit; and
generating a high-throughput training field in accordance with the frequency and space configuration indicated in the channelization field, the high-throughput training field to be used by a receiving station to estimate a channel matrix of a high-throughput communication channel,
wherein the channelization field indicates whether the high-throughput communication channel is a wideband channel, the wideband channel comprising a concurrent use of two or more valid operating channels, and
wherein when the channelization field indicates that the high-throughput communication channel is a wideband channel, the channelization field indicates which of the two or more valid operating channels comprise the wideband channel.

27. The system of claim 26 wherein each of the valid operating channels comprise a single subchannel,
wherein the channelization field further indicates whether the high-throughput communication channel comprises:
a MIMO channel comprising a single subchannel having between two and four spatial subchannels, with up to four distinct data streams transmitted thereon; or
a wideband-MIMO channel comprising two or more frequency separated subchannels wherein each subchannel has two or more spatial channels,
and wherein the wideband channel has a wideband channel bandwidth and comprises between two and four of the subchannels, wherein the subchannels are non-overlapping orthogonal frequency division multiplexed channels, wherein each subchannel has a subchannel bandwidth and comprises a plurality of orthogonal subcarriers, and wherein the spatial channels are non-orthogonal channels associated with one of the subchannels whose orthogonality is achieved by beamforming,
wherein the spatial channels are generated with the at least two antennas, and wherein each spatial channel carries a separate data portion of a data unit comprising an orthogonal frequency division multiplexed symbol.

28. The system of claim 26 wherein the transmitter further comprises a beamformer to apply beamforming coefficients when transmitting the PLCP header to increase a signal to noise ratio of signals received by a receiving station.

29. A computer-readable medium storing instructions, which when executed by one or more processors, cause the processors to perform operations comprising:
generating a channelization field as part of a current data unit, the channelization field indicating a frequency and space configuration of subsequent portions of the current data unit; and
generating a high-throughput training field in accordance with the frequency and space configuration indicated in the channelization field, the high-throughput training field to be used by a receiving station to estimate a channel matrix of a high-throughput communication channel,
wherein the channelization field indicates whether the high-throughput communication channel is a wideband channel, the wideband channel comprising a concurrent use of two more valid operating channels, and
wherein when the channelization field indicates that the high-throughput communication channel is a wideband channel, the channelization field indicates which of the two or more valid operating channels comprise the wideband channel.

30. The computer-readable medium of claim 29 wherein each of the valid operating channels comprises a single subchannel, wherein the instructions, when further executed by one or more of the processors cause the processors to perform operations further comprising generating the channelization field to further indicate whether the high-throughput communication channel comprises:
a MIMO channel comprising a single subchannel having between two and four spatial subchannels, with up to four distinct data streams transmitted thereon; or
a wideband-MIMO channel comprising two or more frequency separated subchannels wherein each subchannel has two or more spatial channels,
wherein the spatial channels comprise non-freguency-orthogonal channels associated with a signal subchannel in which orthogonality between the spatial channels is achieved by antenna diversity.

31. The computer-readable medium of claim 29 wherein the instructions, when further executed by one or more of the processors cause the processors to perform operations further comprising generating the channelization field for transmission on a compatibility channel, the compatibility channel comprising a single subchannel, and
wherein the generating the channelization field comprises rotating a binary phase shift keying (BPSK) modulation of subcarriers of the compatibility channel.

32. A method of communicating over a high-throughput communication channel comprising:
transmitting a channelization field and a high-throughput training field as part of a current data unit, the channelization field indicating a frequency and space configuration of subsequent portions of the current data unit, the high-throughput training field being in accordance with the frequency and space configuration indicated in the channelization field, the high-throughput training field to be used by a receiving station to estimate a channel matrix of the high-throughput communication channel,
wherein the channelization field indicates whether the high-throughput communication channel is a wideband channel, the wideband channel comprising a concurrent use of two or more valid operating channels, and
wherein when the channelization field indicates that the high-throughput communication channel is a wideband channel, the channelization field indicates which of the two or more valid operating channels comprise the wideband channel.

33. The method of claim 32 wherein each of the valid operating channels comprises a single subchannel,
wherein the channelization field further indicates whether the high-throughput communication channel comprises:
a multiple-input-multiple-output (MIMO) channel comprising a single subchannel having between two and four spatial subchannels with up to four distinct data streams transmitted thereon; or
a wideband-MIMO channel comprising two or more frequency separated subchannels wherein each subchannel has two or more spatial channels,
wherein the spatial channels comprise non-frequency-orthogonal channels associated with a signal subchannel in which orthogonality between the spatial channels is achieved by antenna diversity.

34. The method of claim 33 wherein the spatial channels are generated with a plurality of transmit antennas of a transmitting station performing the transmitting, each spatial channel carrying a separate data portion of a data unit comprising an orthogonal frequency-division multiplexed symbol,
wherein each subchannel comprises a plurality of orthogonal frequency division multiplexed subcarriers, and
wherein each orthogonal frequency division multiplexed subcarrier has a null at substantially a center frequency of the other subcarriers to achieve substantial orthogonality between the subcarriers of the associated subchannel.

35. The method of claim 34 wherein the channelization field is transmitted on a compatibility channel, the compatibility channel comprising a single subchannel with one or more spatial channels; and
wherein the transmitting the channelization field comprises transmilling the channelization field on the compatibility channel with a rotated binary phase shift keying (BPSK) modulation of subcarriers of the compatibility channel.

36. The method of claim 34 wherein transmitting comprises:
first transmitting the channelization field as part of the current data unit; and
secondly transmitting the high-throughput training field as part of the current data unit.

37. The method of claim 34 wherein transmitting comprises transmilling the channelization field and the high-throughput training field as part of a single transmission of the current data unit.

* * * * *

UNITED STATES PATENT AND TRADEMARK OFFICE
CERTIFICATE OF CORRECTION

| | |
|---|---|
| PATENT NO. | : 7,324,605 B2 |
| APPLICATION NO. | : 10/810771 |
| DATED | : January 29, 2008 |
| INVENTOR(S) | : Maltsev et al. |

It is certified that error appears in the above-identified patent and that said Letters Patent is hereby corrected as shown below:

In column 21, line 33, in Claim 2, delete "freguency" and insert -- frequency --, therefor.

In column 22, line 7, in Claim 7, delete "RE" and insert -- RF --, therefor.

In column 25, lines 32-33, in Claim 23, delete subehannel" and insert -- subchannel --, therefor.

In column 25, line 55, in Claim 24, delete "subehannel" and insert -- subchannel --, therefor.

In column 25, line 56, in Claim 24, delete "subhannels" and insert -- subchannels --, therefor.

In column 25, lines 59-60, in Claim 24, delete "subehannel" and insert -- subchannel --, therefor.

In column 26, line 20, in Claim 25, delete "transit" and insert -- transmit --, therefor.

In column 27, line 43, in Claim 30, delete "freguency" and insert -- frequency --, therefor.

In column 28, line 49, in Claim 35, delete "transmilling" and insert -- transmitting --, therefor.

UNITED STATES PATENT AND TRADEMARK OFFICE
CERTIFICATE OF CORRECTION

PATENT NO. : 7,324,605 B2
APPLICATION NO. : 10/810771
DATED : January 29, 2008
INVENTOR(S) : Maltsev et al.

It is certified that error appears in the above-identified patent and that said Letters Patent is hereby corrected as shown below:

In column 28, line 60, in Claim 37, delete "transmilling" and insert -- transmitting --, therefor.

Signed and Sealed this

Tenth Day of June, 2008

JON W. DUDAS
*Director of the United States Patent and Trademark Office*